(12) United States Patent
Koch et al.

(10) Patent No.: US 8,203,098 B2
(45) Date of Patent: Jun. 19, 2012

(54) LASER PROCESSING MACHINES AND METHODS FOR PROVIDING A GAS TO THE BEAM GUIDE OF A LASER PROCESSING MACHINE

(75) Inventors: Reiner Koch, Leonberg (DE); Gerhard Link, Knittlingen (DE); Jochen Bihler, Stuttgart (DE)

(73) Assignee: Trumpf Laser-und Systemtechnik GmbH, Ditzingen (DE)

( * ) Notice: Subject to any disclaimer, the term of this patent is extended or adjusted under 35 U.S.C. 154(b) by 612 days.

(21) Appl. No.: 12/267,185

(22) Filed: Nov. 7, 2008

(65) Prior Publication Data

US 2009/0120917 A1    May 14, 2009

Related U.S. Application Data

(63) Continuation of application No. PCT/EP2006/004338, filed on May 9, 2006.

(51) Int. Cl.
*B23K 26/14* (2006.01)

(52) U.S. Cl. .............................. 219/121.84; 219/121.78

(58) Field of Classification Search ............. 219/121.67, 219/121.78, 121.84, 121.6
See application file for complete search history.

(56) References Cited

U.S. PATENT DOCUMENTS

| | | | | |
|---|---|---|---|---|
| 3,860,784 A | * | 1/1975 | Brown et al. | 219/121.64 |
| 4,806,724 A | * | 2/1989 | Kawai et al. | 219/121.68 |
| 5,454,347 A | * | 10/1995 | Shibata et al. | 117/202 |
| 5,811,753 A | | 9/1998 | Weick et al. | |
| 5,897,800 A | * | 4/1999 | Sawai et al. | 219/121.79 |
| 6,018,135 A | * | 1/2000 | Weick | 219/121.79 |
| 6,399,916 B1 | | 6/2002 | Gortler et al. | |
| 6,538,232 B2 | | 3/2003 | Lambert | |
| 6,624,386 B2 | | 9/2003 | Von Borstel | |
| 6,757,055 B1 | * | 6/2004 | Kluft | 356/73 |
| 2002/0040894 A1 | * | 4/2002 | Borstel | 219/121.84 |
| 2004/0094525 A1 | | 5/2004 | Weick et al. | |
| 2004/0211763 A1 | * | 10/2004 | Lambert | 219/121.84 |
| 2005/0061778 A1 | * | 3/2005 | Arakawa et al. | 219/121.6 |
| 2006/0027537 A1 | * | 2/2006 | Lambert et al. | 219/121.6 |

FOREIGN PATENT DOCUMENTS

| | | |
|---|---|---|
| DE | 3822097 | 1/1990 |
| DE | 19734715 | 2/1999 |
| DE | 10226359 | 12/2003 |
| EP | 0163790 | 12/1985 |
| EP | 0749800 | 6/1996 |
| EP | 0896851 | 7/1998 |
| EP | 1180409 | 8/2000 |
| EP | 1182002 | 8/2000 |

(Continued)

OTHER PUBLICATIONS

Machine translation of written description of DE 10226359, May 2011.*

(Continued)

*Primary Examiner* — Geoffrey S Evans
(74) *Attorney, Agent, or Firm* — Fish & Richardson P.C.

(57) ABSTRACT

A laser processing machine having a laser processing head that is open to a workpiece has a device for providing gas to the laser beam guide that introduces a first gas through a first gas inlet into the laser beam guide and introduces a second gas through a second gas inlet into the laser beam guide.

10 Claims, 2 Drawing Sheets

FOREIGN PATENT DOCUMENTS

| | | |
|---|---|---|
| EP | 1386690 | 8/2002 |
| EP | 1640105 | 3/2006 |
| JP | 62-3894 A * | 1/1987 |
| JP | 7-164171 A * | 6/1995 |
| JP | 9-70682 A * | 3/1997 |
| WO | 9533594 | 12/1995 |

OTHER PUBLICATIONS

Notification of Transmittal of Translation of the International Preliminary Report on Patentability, mailed Dec. 24, 2008, 8 pages.
International Search Report for corresponding PCT Application No. PCT/EP2006/004338, mailed Jan. 31, 2007, 8 pages.

* cited by examiner

LASER PROCESSING MACHINES AND METHODS FOR PROVIDING A GAS TO THE BEAM GUIDE OF A LASER PROCESSING MACHINE

CROSS-REFERENCE TO RELATED APPLICATIONS

This application is a continuation application of and claims priority under 35 U.S.C. §120 to PCT Application No. PCT/EP2006/004338, filed on May 9, 2006. The contents of that priority application are hereby incorporated by reference in its entirety.

TECHNICAL FIELD

The invention relates to laser processing machines having a device for providing gas to the laser beam guide, and to a method of providing a gas to the laser beam guide of a laser processing machine.

BACKGROUND

Three dimensional (3D) laser processing machines include a laser processing head having a focusing element and a laser beam guide, as disclosed, for example, in EP 1 640 105 A1. In some cases, the focusing element is a mirror and the beam guide is open towards the processing location. Such machines are mainly used for laser welding.

A clean and constant atmosphere is necessary in the beam guide. Fluctuating $CO_2$ content, the presence of other substances which influence the beam spread, or an uneven temperature distribution over the beam cross-section can change the unprocessed beam and consequently also the properties at the focal point so that the constancy of the processing operation becomes worse.

A solution which is already known is to fill the beam guide with clean nitrogen and to obtain, with a given volume flow, a throughput and also an elevated pressure counter to the introduction of contamination from the environment.

Since the known laser processing head is open towards the processing location, a large amount of expensive pure gas is discharged from the beam guide in this solution.

Similar problems also occur in laser cutting assemblies having optical mirror units, such as, for example, as disclosed in EP 1 623 790 A1. The laser processing head of this laser cutting assembly does not have a lens which seals the beam guide in the direction towards the laser processing region, but instead an open aperture for separation. Expensive pure gas is also discharged from the beam guide through that aperture, but in a substantially smaller quantity than in the above-described laser welding assembly.

EP 1 182 002 A1 has disclosed, for laser cutting machines having an optical lens unit, flushing a lens at the beam guiding side with very pure gas and accordingly increasing the pressure of the flushing gas in the beam guide when pressure decreases. In this case the beam guide is not constructed so as to be open towards the workpiece because the lens seals the beam guide and the processing space relative to each other. Therefore, the pressure adjustment can be carried out in this instance with very pure (expensive) gas without this resulting in a serious cost disadvantage.

SUMMARY

In one aspect, the invention features a laser processing machine for processing a workpiece, the machine comprising: a laser processing head including an optical processing unit that is open to the workpiece; a laser beam guide having a first gas inlet for a first gas and a second gas inlet for a second gas; and a device for supplying a first gas to the first inlet and a second gas to the second inlet.

The invention also features methods of providing gas to the laser beam guide of a laser processing machine.

The machines and methods disclosed herein generally reduce the discharge of pure gas that is used to fill the beam guide in an open optical processing unit. The beam guide is filled by two gases at two different locations of the beam guide. The beam guide is in a manner of speaking subdivided into two gas part-chambers. Very pure gas is supplied to the first gas part-chamber with a low volume flow. The first gas part-chamber comprises the majority of the beam guiding space and is substantially closed. A second gas part-chamber adjoins the first gas part-chamber and is filled with a second gas, preferably a cost-effective gas such as clean air. Only a comparatively small proportion of the beam path is in the second gas part-chamber so that the disruption of the beam spread by the cost-effective gas is comparatively weak. The second gas part-chamber may be open, for example, in an optical mirror unit. Pressure fluctuations, etc., are adjusted in the second gas part-chamber.

The details of one or more embodiments of the invention are set forth in the accompanying drawings and the description below. Other features and advantages of the invention will be apparent from the description and drawings, and from the claims.

DETAILED DESCRIPTION

Figure 1:
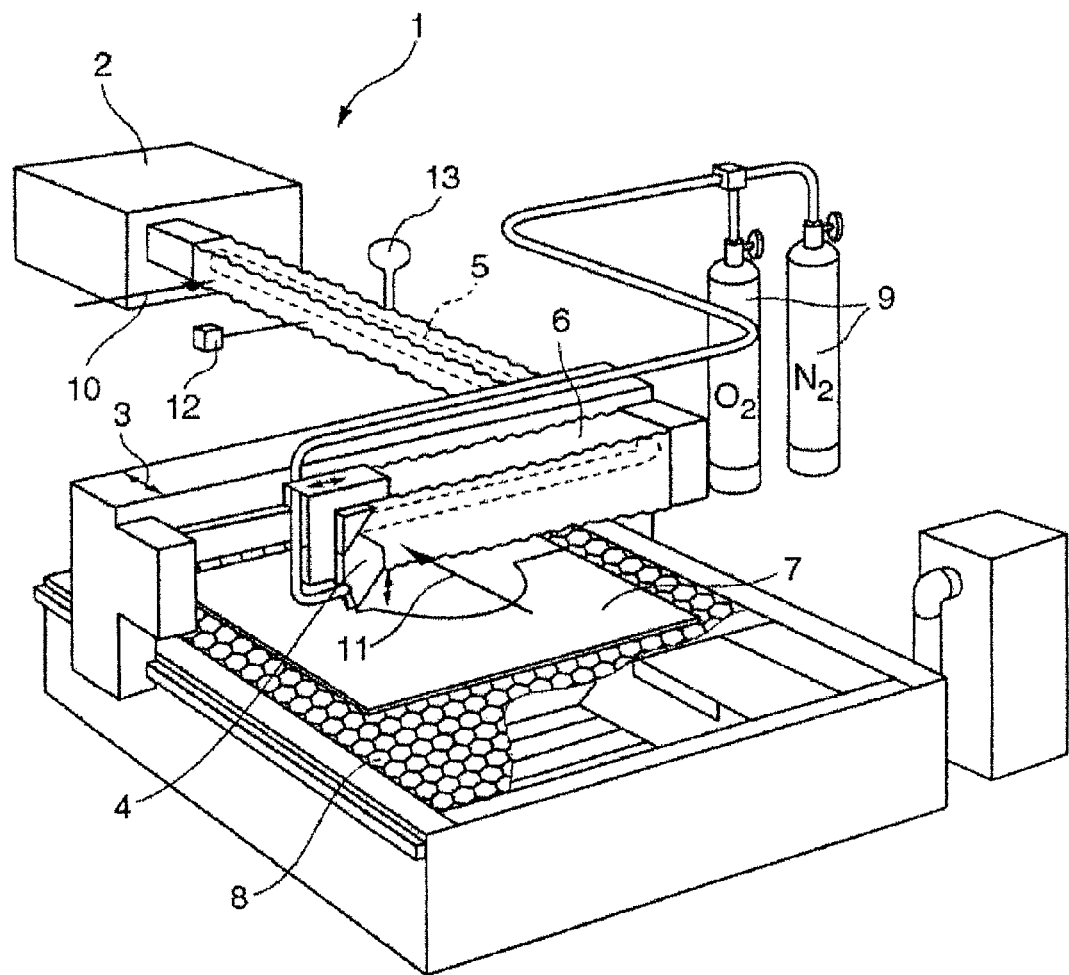
FIG. 1 is a perspective illustration of a laser cutting assembly.

FIG. 1 shows a laser processing machine 1 that includes a laser generator 2 (e.g., a $CO_2$ laser) and a laser processing head 4 which can be moved relative thereto in the direction of the double-headed arrow 3. A laser beam 5, which is produced by means of the laser generator 2, is directed from the laser generator 2, through a beam guiding space 6 which is flushed with a gas, to the processing head 4. The laser beam 5 is directed by the processing head 4 onto a workpiece 7 which is to be processed. The workpiece 7 is in the form of a metal sheet which is deposited on a workpiece support 8 of the laser processing machine 1.

Both laser piercing and laser-cutting are supported by the addition of a gas. Oxygen, nitrogen, compressed air and/or application-specific gases can be used as cutting gases 9. Which gas is ultimately used is dependent on which materials are being cut and which quality requirements are placed on the workpiece. Cutting gas is supplied in the processing head near the processing location.

The beam guiding space 6 is substantially filled with pure gas, for example, nitrogen. The beam guiding space 6 is delimited by a bellows or another hermetic closure (for example a tube, telescopic tube, flexible tube, or the like).

The laser beam 5 is redirected and focused inside the laser processing head 4 so that a focused laser beam is directed onto the workpiece. A housing region of the laser processing head 4 associated with the beam guide 6 is separated from a housing region associated with the nozzle of the laser processing head by a mirror focusing unit (not shown), for example as disclosed by EP 1 623 790 A1 (U.S. 2006/027537, the full disclosure of which is incorporated herein by reference). The mirror focusing unit separates the process gas side and the beam guiding atmosphere from each other, and directs the laser beam 5 by an intermediate focal point. The components of the mirror focusing unit include a focusing paraboloid mirror and an ellipsoid mirror. An element that defines a small aperture through which the laser beam 5 passes is fitted at the intermediate focal point between the two mirrors. This type of optical processing unit results in an open beam guiding system. The diameter of the aperture is selected so as to be sufficiently large that the laser beam does not touch its edge and sufficiently small that the leakage loss of flushing gas from the beam guide side into the process side is low.

In order to flood the beam guide 6 with gas, pure gas having a pressure of 1.1 bar is introduced at a first gas inlet 10 directly downstream of the laser generator 2. In order to reduce the throughput of pure gas, a second gas inlet 11 is provided directly upstream of the laser processing head 4 in the beam guide 6. At that location, cleaned air is introduced in place of pure gas. Practically the whole of the beam guide 6 is flooded with pure gas so that expansion of the laser beam 5 is prevented. Cleaned air is introduced transversely relative to the flow of pure gas by means of the second gas inlet 11. The end of the beam guide 6 and the laser cutting head 4 are filled predominantly with the cleaned air, mixed with a small proportion of the pure gas. The gas/air mixture can be discharged via a nozzle opening (not shown) of the cutting head.

In order to prevent damaging excess pressure in the beam guide 6, an excess pressure valve 12 and a gas compensation volume 13 are provided.

Figure 2:
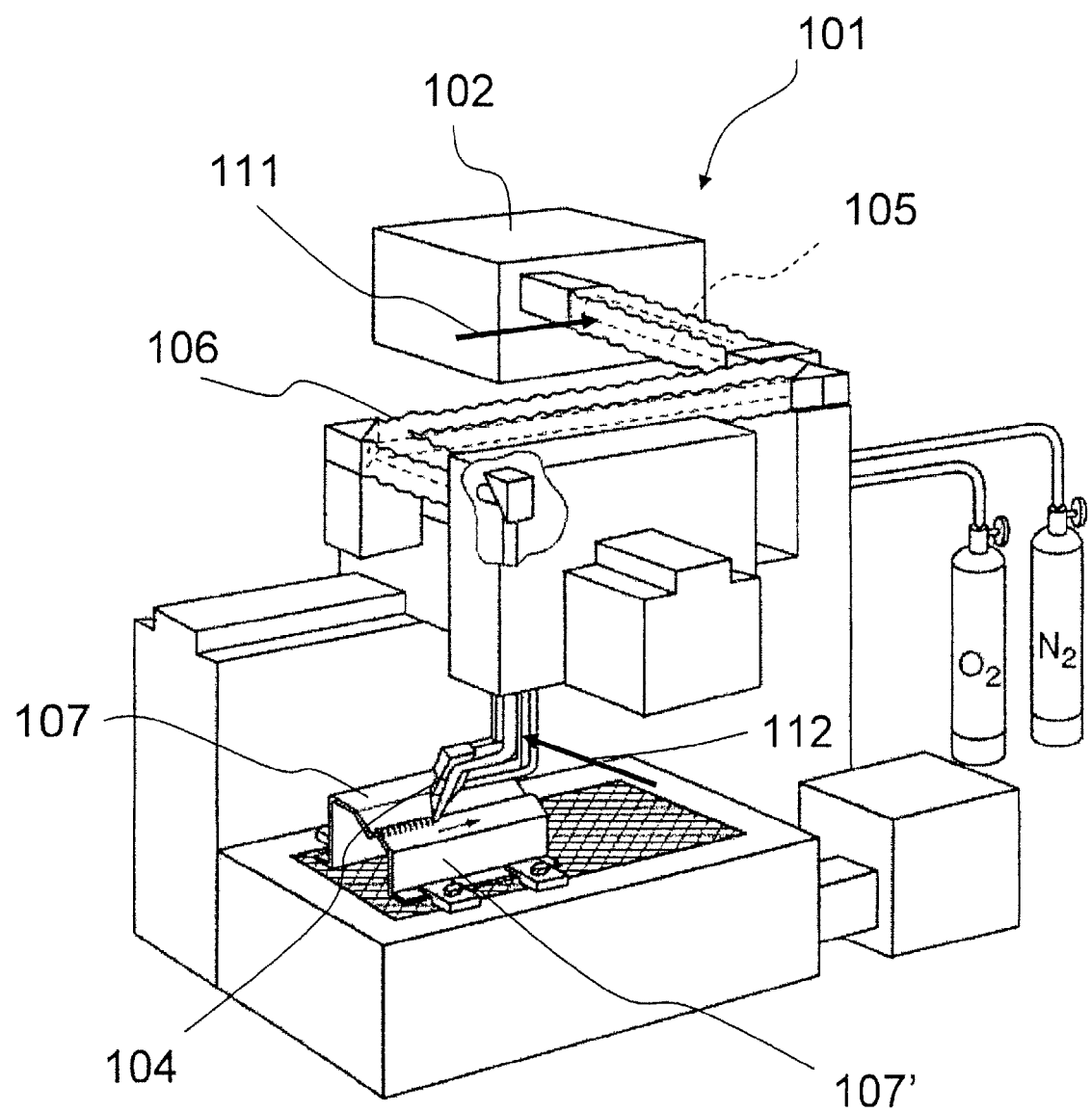
FIG. 2 is a perspective illustration of a laser welding assembly.

FIG. 2 shows the construction of a laser welding assembly 101. A machine frame carries the movement unit of the machine and the beam guiding system having redirecting mirrors for a laser beam 105 which is produced in the laser generator 102.

A laser welding head 104 having a tilted mirror and a focusing mirror (not shown) is movable by means of two axes of rotation and in three directions in order best to be able to process a weld seam, for example to join together two components 107 and 107' which are arranged on a support. The components 107 and 107' are fixed in position by means of a clamping device. For the laser welding, process gases (working gas, protective gas) can be supplied to the laser welding head 104 and can be discharged by means of a discharge device.

A beam guiding chamber 106 is substantially filled with pure gas, for example, nitrogen. The beam guiding chamber 106 is delimited by a bellows or another hermetic closure (e.g., a tube, telescopic tube, or the like).

In order to fill the beam guide 106 with a suitable gas, pure gas having a pressure of 1.1 bar is introduced at a first gas inlet 111 directly downstream of the laser generator 102. In order to reduce the throughput of pure gas, a second gas inlet 112 is provided directly upstream of the laser processing head 104 in the beam guide 106. At that location, cleaned air is introduced in place of the pure gas. Practically the entire beam guide 106 is filled with pure gas so that expansion of the laser beam 105 is prevented. Cleaned air is introduced transversely relative to the pure gas flow by means of the second gas inlet 112. The end of the beam guide 106 and the laser welding head 104 are filled with cleaned air. The gas/air mixture can be discharged via the nozzle opening of the laser processing head.

In both embodiments, the pressure under which the pure gas (nitrogen) is provided is relatively high, whereas the air pressure of the air which is introduced near the laser processing head 4, 104 is relatively low. On the other hand, the volume flow of the pure gas is relatively low (naturally, some pure gas is also discharged by the processing head 104, but only a comparatively small amount) and the volume flow of the cleaned air is comparatively high. In some implementations, up to 65 liters less pure gas is needed than would be used in a conventional process.

A number of embodiments of the invention have been described. Nevertheless, it will be understood that various modifications may be made without departing from the spirit and scope of the invention. For example, while cleaned air has been described above as the second gas, other gases may be used. Accordingly, other embodiments are within the scope of the following claims.

What is claimed is:

1. A laser processing machine for processing a workpiece, the machine comprising:
    a laser generator;
    a laser processing head that includes an optical processing unit that is open to the workpiece and that comprises a focusing unit;
    a laser beam guide, arranged in fluid communication between the laser generator and the laser processing head, having a first gas inlet for a pure gas arranged directly downstream of the laser generator and a second gas inlet for a cost-effective gas arranged directly upstream of the laser processing head, and wherein both the first gas inlet and the second gas inlet are arranged upstream of the focusing unit; and
    a device for supplying the pure gas to the first gas inlet at a low volume flow and supplying the cost-effective gas to the second gas inlet at a volume flow that is relatively higher than the volume flow of the pure gas.

2. A laser processing machine according to claim 1, further comprising a gas compensation volume provided at the laser beam guide.

3. A laser processing machine according to claim 1, further comprising an excess pressure valve provided at the laser beam guide.

4. The laser processing machine of claim 1, wherein the focusing unit comprises a mirror focusing unit.

5. A method for supplying gas to a laser beam guide in a laser processing machine having a laser generator and a laser processing head that is open to a workpiece and that comprises a focusing unit, the method comprising:
    introducing a pure gas, at a low flow volume, into a first portion of the laser beam guide via a first inlet arranged in the beam guide directly downstream of the laser generator, and
    introducing a cost-effective gas, at a flow volume that is relatively higher than the flow volume of the pure gas, into a second portion of the laser beam guide via a second inlet arranged in the beam guide directly upstream of the focusing element and downstream of the first inlet.

6. A method according to claim 5, wherein the pure gas is pure nitrogen.

7. A method according to claim 5, wherein the cost-effective gas is cleaned air.

8. A method according to claim 5, wherein the pressure under which the pure gas is introduced is relatively higher than the pressure under which the cost-effective gas is introduced.

9. A method according to claim 5, wherein the cost-effective gas is introduced transversely to a direction of flow of the pure gas.

10. The method of claim 5, wherein the focusing unit comprises a mirror focusing unit.

\* \* \* \* \*